(No Model.)

W. H. HALL.
HORSE COLLAR.

No. 257,002. Patented Apr. 25, 1882.

WITNESSES:
Francis McArdle
C. Sedgwick

INVENTOR:
W. H. Hall
BY Munn & Co
ATTORNEYS.

UNITED STATES PATENT OFFICE.

WILLIAM H. HALL, OF NEW YORK, N. Y.

HORSE-COLLAR.

SPECIFICATION forming part of Letters Patent No. 257,002, dated April 25, 1882.

Application filed February 9, 1882. (No model.)

*To all whom it may concern:*

Be it known that I, WILLIAM H. HALL, of the city, county, and State of New York, have invented a new and Improved Combined Horse-Collar and Breast-Band, of which the following is a full, clear, and exact description.

The invention consists in the combination, with a horse-collar, of a breast-band attached to the ends of the same and extending downward from the ends of the collar, so as to fit tightly against the animal's breast.

Reference is to be had to the accompanying drawings, forming part of this specification, in which similar letters of reference indicate corresponding parts in both figures.

Figure 1:
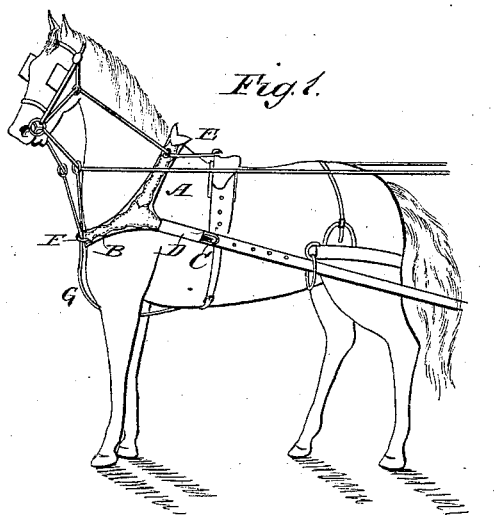
Figure 2:
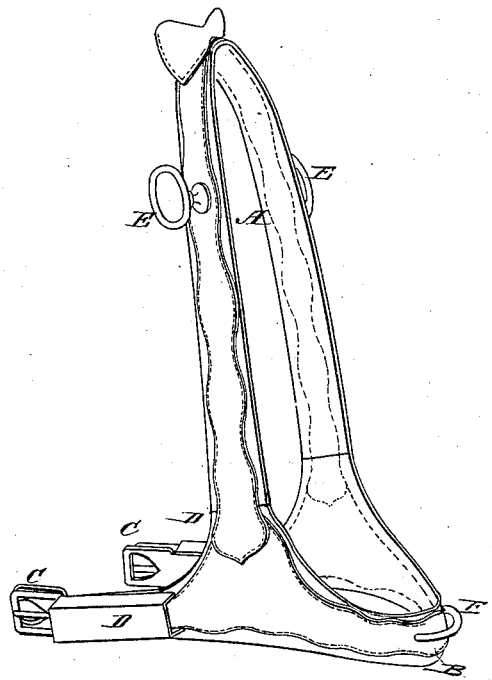

Figure 1 is a perspective view of a horse provided with my improved combined horse-collar and breast-band, and Fig. 2 is a perspective view of my improved combined horse collar and breast-band.

The horse-collar A is attached at its lower ends to a breast-band, B, provided at its ends with trace-buckles C, and with loops D for the ends of the traces. The collar is provided near its top with terrets E for the reins or check-reins.

The combined horse-collar and breast-band made heretofore consisted of two pieces united at the top of the collar and at the middle of the breast-band, and the breast-band consisted simply of a broad strap extending from one end of the collar to the other. I make the breast-band out of a separate piece of leather, and cut it in such a manner that it is inclined downward slightly from the ends of the collar, and will thus fit closely against the breast of the animal, and will not chafe or cut the same, as a straight strap or breast-band does.

If the breast-band is cut and made in the manner shown and described, the strain of the same can be borne very well by the horse, and the strain will be distributed equally over the collar and the breast-band.

By attaching or sewing the ends of the collar to the breast-band, as described, the front seam of the breast-band is avoided and the breast-band can be fitted much better to the shape of the horse's breast than if the combined collar and breast-band is made of two pieces united at the top of the collar and the middle of the breast-band. A loop, F, through which the martingales G pass, is atached to the front of the breast band B, as shown.

I am aware that it is not new to use an ear on each rear side of collar to connect with traces, or to use both hame and collar with ears connecting with an equalizer to which the traces may be adjustably attached; but

What I claim is—

The combination, with the collar A, of the separate breast-band B, inclined downwardly to the front from the points of attachment to ends of the collar, and provided at its lower rear ends with loops and buckles, whereby the collar and breast-band will set on a horse, as shown, and for the purpose specified.

WILLIAM H. HALL.

Witnesses:
 OSCAR F. GUNZ,
 C. SEDGWICK.